S. R. CHAPIN.
DIRECTION INDICATOR FOR MOTOR VEHICLES.
APPLICATION FILED FEB. 7, 1918.

1,275,131.

Patented Aug. 6, 1918.

WITNESS:

INVENTOR,
Sumner R. Chapin,
BY
Harry W. Bourn.
ATTORNEY.

UNITED STATES PATENT OFFICE.

SUMNER R. CHAPIN, OF SPRINGFIELD, MASSACHUSETTS.

DIRECTION-INDICATOR FOR MOTOR-VEHICLES.

1,275,131.     Specification of Letters Patent.     Patented Aug. 6, 1918.

Application filed February 7, 1918. Serial No. 215,889.

*To all whom it may concern:*

Be it known that I, SUMNER R. CHAPIN, citizen of the United States of America, residing at Springfield, in the county of Hampden and State of Massachusettts, have invented certain new and useful Improvements in Direction-Indicators for Motor-Vehicles, of which the following is a specification.

This invention relates to improvements in direction indicators for motor vehicles for the purpose of indicating to the traffic officer, or, to a person driving a motor vehicle who may be following the one ahead of him, and on which the indicator is located, for the purpose of showing the direction the driver of the first machine wishes to take, that is to say, either to the right, left, or directly ahead. Oftentimes serious accidents occur because the operator of a motor vehicle, or a traffic officer, does not definitely understand in advance, which direction a driver of a machine wishes to take. Broadly considered, the invention comprises a cylindrical or casing member within which is located devices for operating a pair of pointers by means of a slidable rod which extends to within easy reach of the operator of the vehicle. These pointer devices are simultaneously operated and are so located as to be easily readable, either at the front or rear ends of the casing containing the pointers. Suitable means are provided for attaching the indicator mechanism to the vehicle so as to bring the same within easy reach of the operator. Means are also provided for adequately illuminating the interior of the casing in order to render the pointers plainly readable at night. Means are also provided for adjustably retaining the pointers in their different indicating positions as will be fully explained in the body of the specification. It is understood that obvious changes in form or proportions are included within the scope of my invention.

Referring to the different figures of the drawings.

Figure 1:
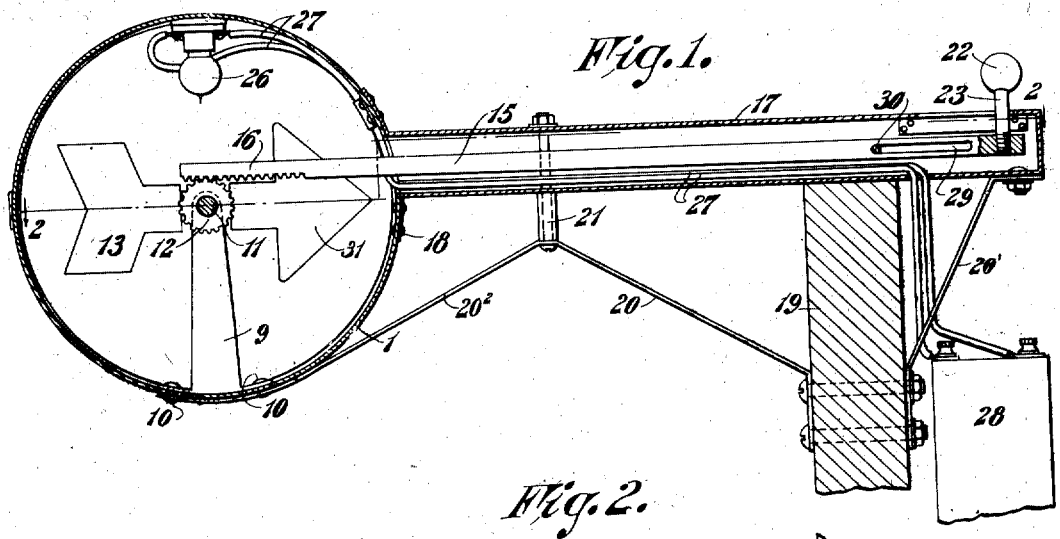
Figure 1 is a vertical sectional view on the broken line 1—1 of Fig. 2, showing the interior construction of the inclosing casing within which the indicator or pointer devices are located, also, the hollow arm in which a slidable rod is located for operating the pointer devices.
Figure 2:
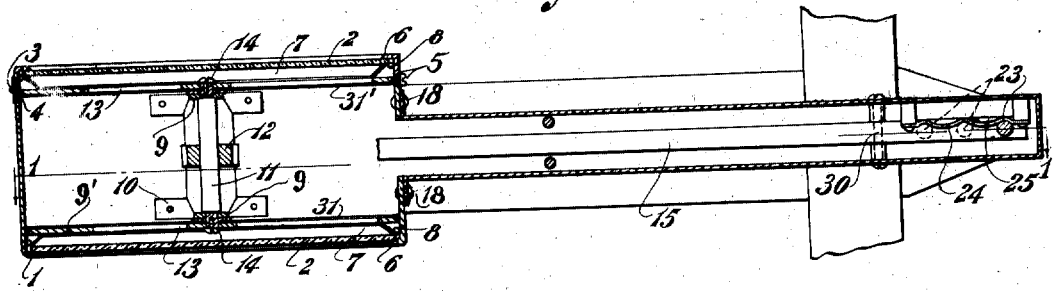
Fig. 2 is a horizontal sectional view on the broken line 2—2 of Fig. 1, showing the operating shaft to which the pointers are secured, also the pinion for operating same, by means of the rack on the rod, and, the flat spring for retaining the rod in its different positions of adjustment.
Figure 3:
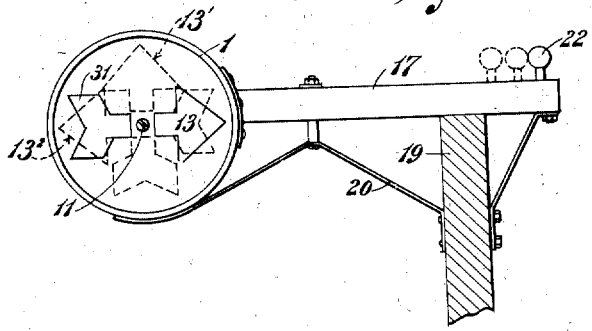
Fig. 3 is an end elevational view showing the pointers, or indicators in the three different positions.

Referring now to the drawings in detail:

1 indicates a suitable inclosing casing, preferably formed from thin sheet metal as steel or brass, the opposite ends of which casing are provided with an opening. These openings are closed with the plates of glass indicated at 2. One end of the casing is formed with a removable portion or section as indicated at 3. This section is secured in place by any suitable means as for example a hinge shown at 4, and any suitable securing means shown at 5. The plates of glass bear against, or engage the stops or ledges 6 of the casing. 7 indicates a beveled ring which rests against the plates of glass. This ring is retained in place by means of the spring wire ring 8. Located within the casing and secured to the bottom portion thereof, are the brackets 9 which are secured to the casing by means of the rivets 10. 11 is a shaft pivotally supported in the upper ends of the bracket 9. Mounted on and secured to the shaft 11 is an operating gear 12. Secured to the ends of the shaft 11 are the direction indicators, or arrows, 13 by means of the screws 14. These indicating arrows are formed by means of the arrow shaped openings which are cut out of the opaque disks 9' that are secured to the ends of the shaft 11. These disks may consist of any suitable substance as for example thin metal. 31 represents transparent pieces, as thin celluloid, which are secured to the rear sides of the metal disks 9'. The forward one, 31', may be white and the rear one, 31, is preferably composed of some red substance. These thin, transparent substances therefore permit the light to show through the same when the interior of the casing 1 is illuminated, as will be described. The disks 9'; it should be understood, therefore turn with the shaft 11 when the same is rotated by the rod 15. These indicating arrows, as shown in Figs. 1 and 2, are designed to be operated and turned by means of the shaft 11 when the same is actuated by means of the push rod 15. This rod is provided with a rack 16 on its lower side, as shown. It meshes with the teeth of the gear 12. This rod is located in the hollow arm 17 that supports the casing 1, being secured thereto by means of the rivets 18. 19 represents a suitable support or standard which may be a part of the motor vehicle to which the arm 17 is secured by means of the braces 20 and 20′, and support 21 on the under side of the arm 17. The bracket 20 may be extended and secured to the casing 1 as shown at 20². The arm, or casing, 17 extends toward the right and its inner end is located and terminates within convenient reach of the operator. The push rod 15 for operating the shaft 11 is provided with an operating knob 22 that is connected to an upright 23, which is secured to the rod 15 in any suitable manner. For the purpose of retaining the rod 15 in the different positions of longitudinal adjustment, a flat spring 24 is provided, which spring is formed with the recesses 25 to receive the upright 23 when it is snapped from one recess to the next during the operation of the push rod 15 in order to retain the indicating disks 9′ having the arrow shaped openings 13, in adjustment. When the push rod 15 is moved toward the left, the arrow shaped openings 13 are shown pointing upward or straight ahead, as indicated by the dotted lines 13′, in Fig. 3. When the push rod 15 is pushed still farther toward the left, the arrow openings stand in the position shown at 13², indicating that the driver of the vehicle wishes to turn to the left.

For the purpose of illuminating the space between the arrow indicating mechanism, an electric lamp 26 is placed within the casing 1 which is connected by means of the wires 27 that lead through the hollow arm or casing 17 to a suitable source of electric energy, indicated at 28. A suitable switch may of course be provided in the connections for turning on and off the current to the lamp 26 as desired. The push rod 15 is provided with a slot 29 for the purpose of limiting its outward and inward movements in operating the disks 9′ which show the arrow openings 13. The pin 30, in the slot 29, serves as the limiting stop for the rod 15.

It will be seen from this description that I have provided a direction indicator device that can be readily installed on any existing motor vehicle and one that can be easily operated by the driver to indicate the direction he wishes to go, also that the arrows are plainly visible both to the front and rear of the machine either in day or night time. The arrows 13 may be colored, if desired, as red, to make them plainly visible.

What I claim is:

1. A direction indicator for motor vehicles, comprising, in combination, a casing having transparent closures in its opposite ends, means for attaching the same to a fixed part of a motor vehicle, movable indicators comprising members of opaque material with indicator openings formed therein and located within the casing, said indicators being spaced from each other, means for retaining the indicator operating means in different positions of adjustment, and illuminating means located between the spaced indicators for rendering the openings in the indicators visible.

2. A direction-indicator, comprising, in combination, an inclosing casing, a shaft rotatably supported in the casing and on the ends of which direction indicating arrows formed by openings in the opaque members are secured, a transparent piece over the opaque members, a pinion on the shaft, an arm for attaching the casing to a part of a motor-vehicle, means engaging the pinion for operating the shaft, whereby when the pinion engaging means is operated, the indicating devices will be operated in unison by the shaft, means for holding the indicating devices in different positions of adjustment, as described.

3. A direction indicator, comprising, in combination, an open ended inclosing casing formed with transparent closures for its open ends and at the front and rear ends respectively, a rotatable shaft within the casing and to the ends of which indicating arrows formed by openings in opaque members which are connected to the shaft, means for illuminating the interior of the casing comprising an electric lamp, a supporting arm for the casing attached to the motor vehicle, said arm being hollow to receive the operating devices for the indicators and the wires from the lamp to a suitable source of electric energy.

4. A direction indicator for motor vehicles comprising, in combination, an inclosing casing, a shaft rotatably mounted therein, disks secured to the ends of the shaft and having an arrow shaped opening formed in each disk, a transparent piece secured to the inner side of the disks and over the openings therein to show the position of said opening when the shaft is rotated, and means for operating the shaft, and means for illuminating the interior of the casing.

5. A direction indicator for motor vehicles comprising, in combination, an inclosing casing, a shaft rotatably mounted therein, a disk of opaque material secured to the shaft and having an arrow shaped opening formed therein, a transparent piece of colored material secured to the inner side of the disk and over the opening, to show the position of said opening when the shaft is rotated, means for operating the shaft, and means for illuminating the interior of the casing, a rod engaging a pinion on the shaft, said rod being located within a hollow arm to which the casing is secured.

6. A direction indicator for motor vehicles comprising, in combination, an inclosing casing, a shaft rotatably mounted therein, a disk secured to the shaft and having an arrow shaped opening formed therein, a transparent piece secured to the inner side of the disk and over the opening in the disk to show the position of said opening when the shaft is rotated, means for operating the shaft, means for illuminating the interior of the casing, a rod and a spring for securing the rod in different positions of adjustment for the purpose described.

SUMNER R. CHAPIN.